(12) United States Patent  (10) Patent No.: US 8,286,767 B2
Malinowski  (45) Date of Patent: Oct. 16, 2012

(54) COMBINATION SUITCASE AND BABY CARRIER

(76) Inventor: Susan M. Malinowski, Birmingham, MI (US)

( * ) Notice: Subject to any disclaimer, the term of this patent is extended or adjusted under 35 U.S.C. 154(b) by 392 days.

(21) Appl. No.: 12/564,149

(22) Filed: Sep. 22, 2009

(65) Prior Publication Data
US 2010/0072012 A1   Mar. 25, 2010

Related U.S. Application Data

(60) Provisional application No. 61/099,367, filed on Sep. 23, 2008.

(51) Int. Cl.
A45C 5/14 (2006.01)
(52) U.S. Cl. .............. 190/8; 190/18 A; 190/115; 280/37
(58) Field of Classification Search ............ 190/8, 18 A, 190/115; 280/37
See application file for complete search history.

(56) References Cited

U.S. PATENT DOCUMENTS

| | | | | |
|---|---|---|---|---|
| 324,617 A * | 8/1885 | Walsh et al. | ................ | 280/37 |
| 3,679,223 A * | 7/1972 | Sakal | ............... | 280/37 |
| 6,193,033 B1 * | 2/2001 | Sadow et al. | ............... | 190/18 A |
| 7,051,853 B2 * | 5/2006 | Brown | ............... | 190/18 A |
| 7,717,440 B1 * | 5/2010 | Baba | ............... | 280/47.371 |
| 2004/0021353 A1 * | 2/2004 | Lozano et al. | ............... | 297/255 |

* cited by examiner

Primary Examiner — Tri Mai
(74) Attorney, Agent, or Firm — Gifford, Krass, Sprinkle, Anderson & Citkowski, P.C.

(57) ABSTRACT

A combination suitcase and baby carrier having a housing and a handle movable between a storage position and an extended position. The handle is also pivotal between a first position in which the handle is coplanar with the bottom and a second position in which the handle lies in a plane oblique to the plane of the housing bottom. A rear wheel support bracket having at least one rear wheel is pivotally mounted to the housing adjacent the end of the housing between a collapsed position in which the rear wheel is contained within the housing, and an operational position in which the rear wheel protrudes outwardly and downwardly from the housing bottom. A front wheel also extends outwardly from the bottom of the housing so that the housing can be supported by both the rear and front wheel. A housing top may then be open and movable against the handle to form a seat back for a baby carrier.

7 Claims, 4 Drawing Sheets

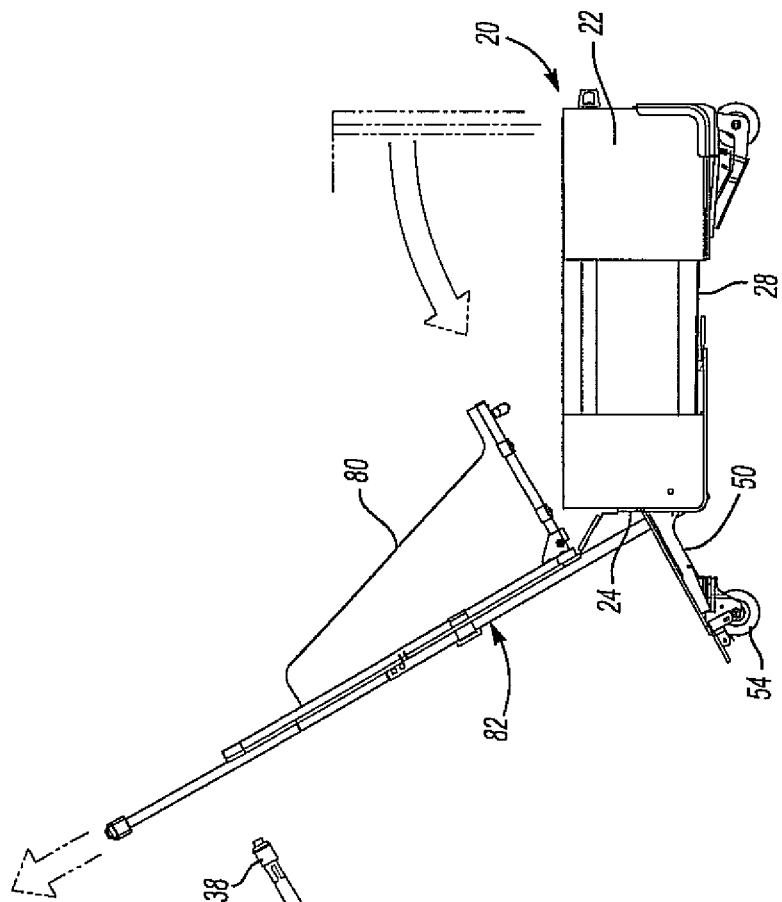
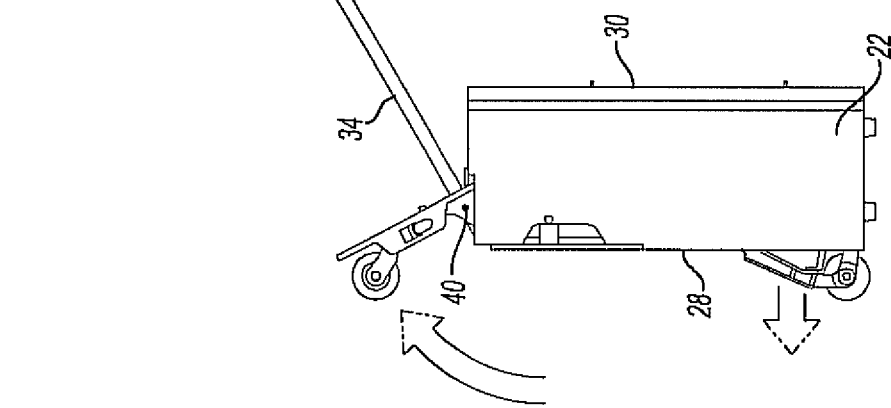
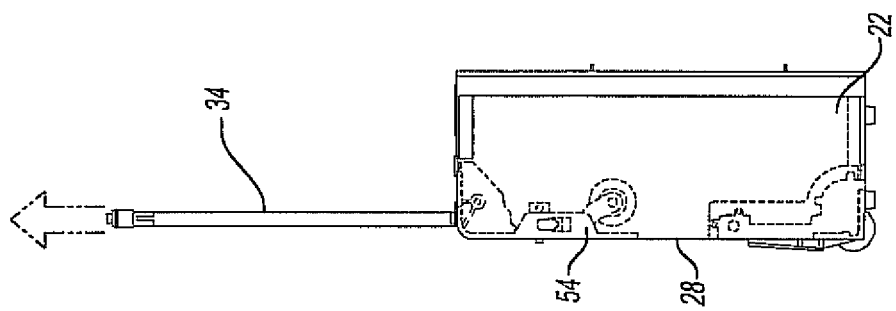

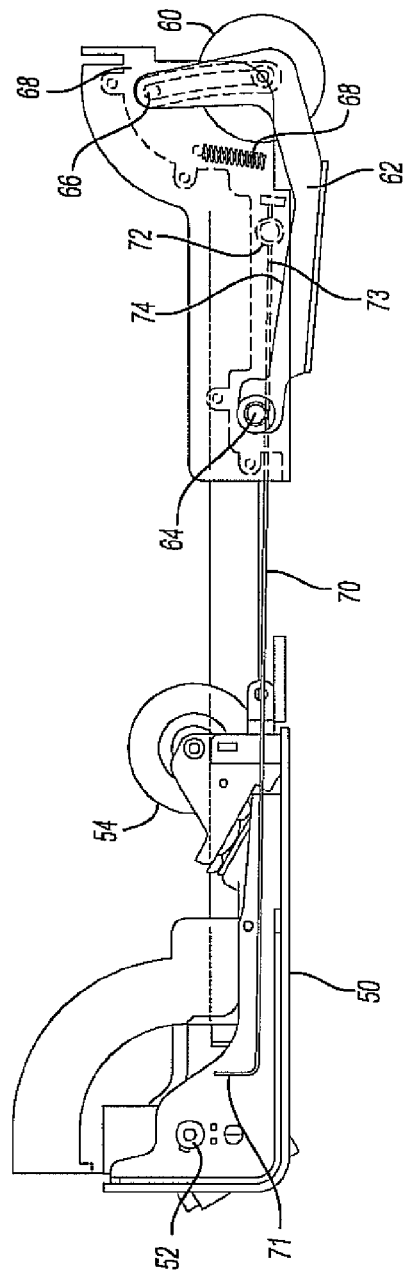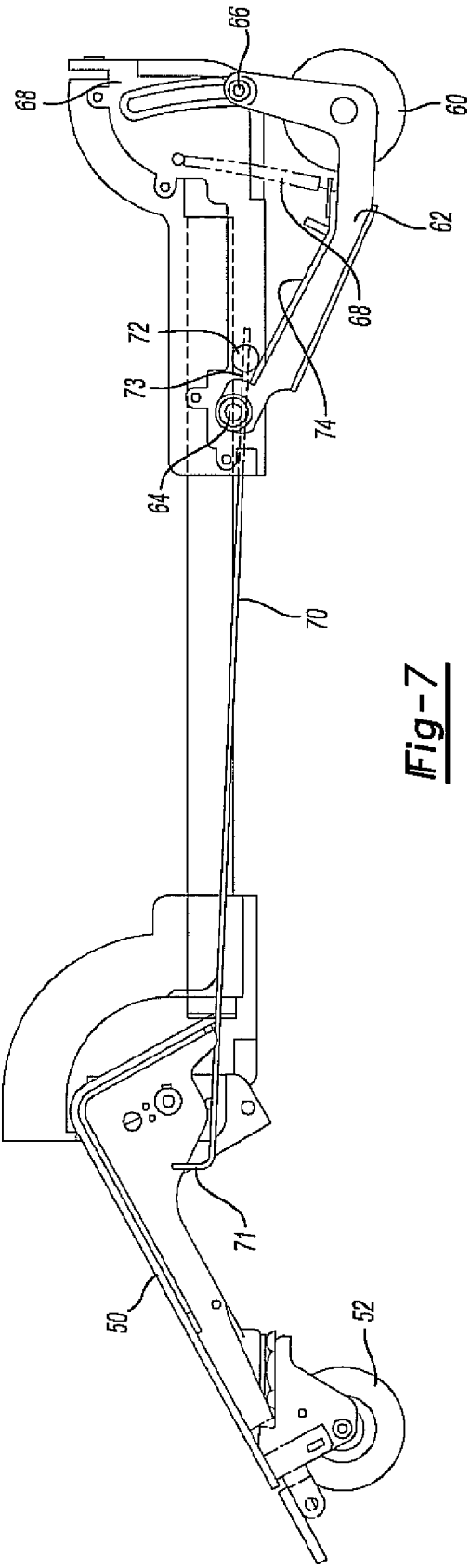

COMBINATION SUITCASE AND BABY CARRIER

CROSS-REFERENCE TO RELATED APPLICATIONS

This application claims priority of U.S. Provisional Patent Application Ser. No. 61/099,367 filed Sep. 23, 2008, which is incorporated herein by reference.

BACKGROUND OF THE INVENTION

I. Field of the Invention

The present invention relates generally to a combination suitcase and baby carrier.

II. Description of Related Art

Travel through airports is particularly difficult when accompanied by an infant or toddler. Typically, the adult supervising the infant or toddler must contend not only with the infant or toddler, but also with his or her own luggage.

One previously known solution is to transport the infant or toddler in a knapsack or body worn infant carrier. This, in turn, allows the adult two free hands to transport his or her own luggage through the airport.

One disadvantage of this solution, however, is that it is tiring to carry a child through an airport, particularly where a relatively long distance must be traveled through the airport. This is particularly true as the child grows older and gains weight.

A still further solution has been to use a collapsible baby stroller to transport the child through the airport. This solution, however, almost requires two adults since it is difficult to push a baby stroller with one hand and carry or otherwise transport luggage with the other hand.

For all the foregoing reasons, it has been previously difficult to transport one's luggage as well as an infant or toddler through an airport by a single adult.

SUMMARY OF THE PRESENT INVENTION

The present invention provides a combination suitcase and baby carrier which overcomes all of the above-mentioned disadvantages of the previously known practices.

In brief, the combination suitcase and baby carrier of the present invention comprises a housing which forms a suitcase and thus has internal compartments for the storage of personal items and clothes. Preferably the housing is generally rectangular in shape and thus has a top, bottom, and two spaced apart ends.

An elongated handle is then slidably mounted to guides attached to the housing so that the handle is movable between a storage position in which most of the handle is contained in the housing, and an extended position in which the handle extends outwardly from one end of the housing.

The handle is also pivotal, together with the guides, between a first and a second position. In the first position, the handle lies in a plane generally parallel to the plane of the bottom of the housing. Conversely, in the second position, the handle lies in a plane oblique to the plane of the housing bottom.

A rear wheel support bracket is pivotally mounted to the housing adjacent the one end of the housing and at least one, and preferably two spaced apart rear wheels are attached to the rear wheel support bracket. This rear wheel support bracket is movable between a collapsed position and an operational position. In its collapsed position, the rear wheel or rear wheels are contained within the housing and the support bracket is flush against the housing. Conversely, in its operational position, the rear wheel support bracket extends outwardly from the end of the housing and downwardly from the bottom so that the rear wheel or rear wheels are also spaced downwardly from the bottom of the housing for contact with the ground surface.

At least one, and preferably two spaced apart front wheels are also mounted to the housing adjacent the bottom and the other end of the housing. Optionally, the front wheel or wheels are pivotal between a collapsed position and an operational position. In their collapsed position, the front wheel or wheels are at least partially contained within the housing. Conversely, in the operational position, the front wheel or wheels extend downwardly from the bottom of the housing for contact with the ground support surface. An actuator extending between the rear wheel support bracket and the front wheel preferably pivots the front wheel to its operational position in response to the pivotal movement of the rear wheel support bracket from its collapsed and to its operational position.

A top of the housing is selectively separated from the housing and moved against the elongated handle when the elongated handle is in its second position. In doing so, the top of the housing forms a back of the baby seat. Conventional straps, safety belts, and the like are attached to the top of the housing to retain the child within the seat.

In operation, the device of the present invention may be rapidly converted from a suitcase to a combination suitcase and baby carrier by simply extending the handle outwardly from the housing and then pivoting it to its second position. Thereafter, the rear wheel support bracket is pivoted to its operational position so that the entire housing is rollingly supported by the front and rear wheels. The top of the housing is then opened and attached to the handle to form the back for the baby carrier. The handle is then used to push the combination suitcase and baby carrier through the airport or the like as desired.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 3 is a side view thereof and illustrating the handle in an extended position;

FIG. 4 is a view similar to FIG. 3, but illustrating the handle in an extended and pivoted position;

FIG. 5 is a view similar to FIG. 4, and also illustrating the wheels in an operational position;

FIG. 6 is a side view illustrating the wheel actuator mechanism in a collapsed position;

FIG. 7 is a side view illustrating the wheel actuator mechanism in an operative position.

DETAILED DESCRIPTION OF A PREFERRED EMBODIMENT OF THE PRESENT INVENTION

Figure 1:
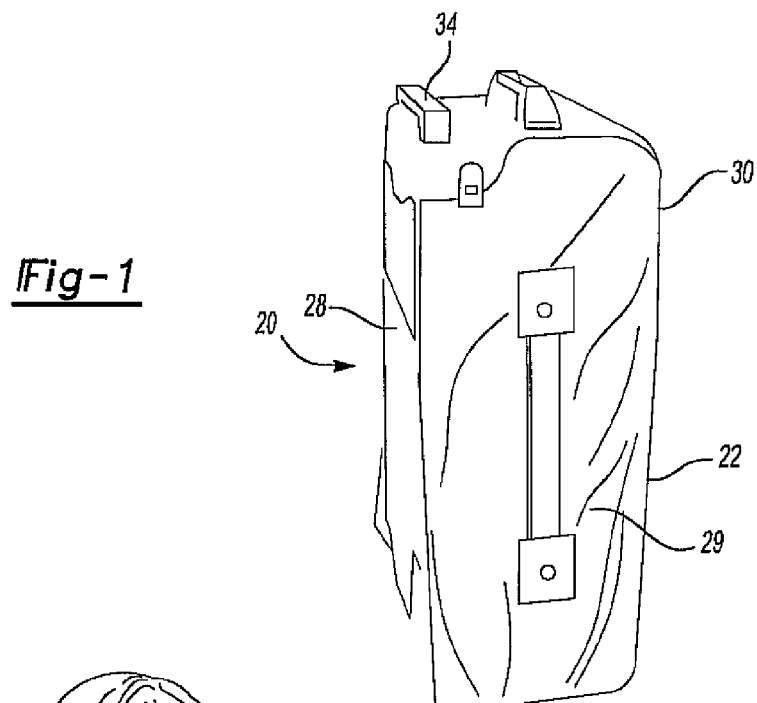
FIG. 1 is an elevational view of a preferred embodiment of the combination suitcase and baby carrier of the present invention in a suitcase configuration.
Figure 2:
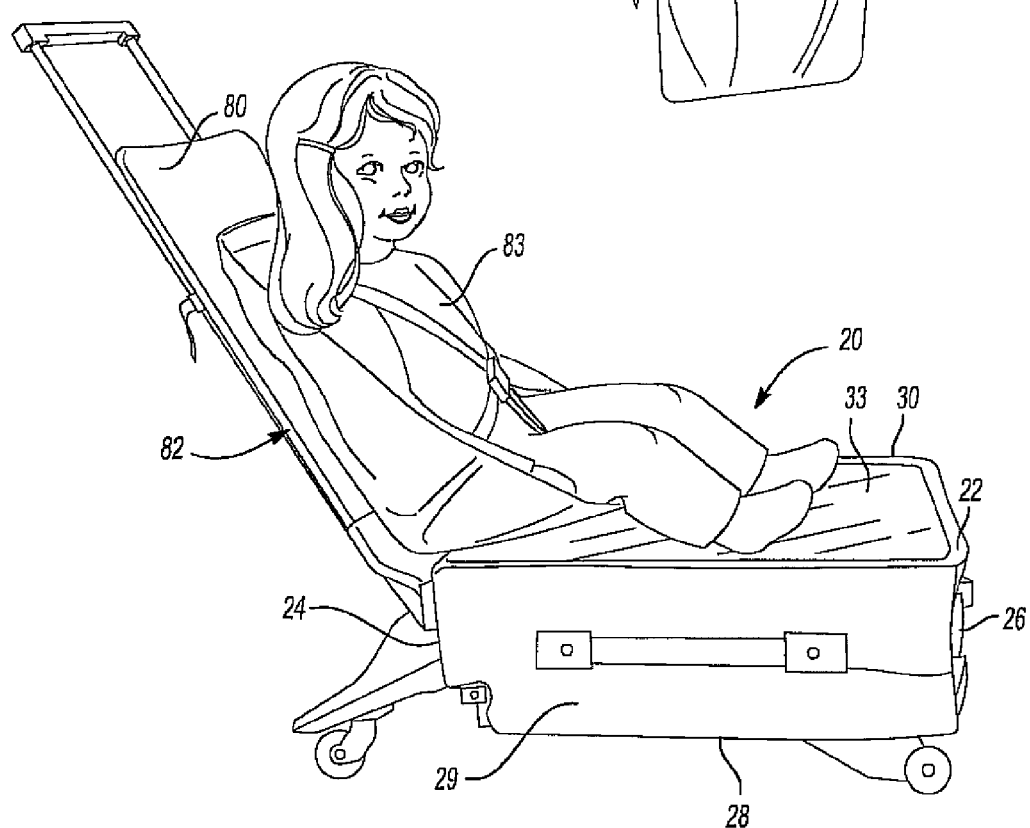
FIG. 2 is an elevational view of the combination suitcase and baby carrier of the present invention in a baby carrier configuration.

With reference first to FIGS. 1 and 2, a combination suitcase and baby carrier 20 according to the present invention is shown. The combination suitcase and baby carrier 20 may be converted from a straightforward suitcase, as shown in FIG. 1, to a combination suitcase and baby carrier, as shown in FIG. 2, in a fashion to be subsequently described in greater detail.

The combination suitcase and baby carrier 20 according to the present invention includes a housing 22 having a first or rear end 24, a second or front end 26, a bottom 28, a top 30, and two spaced apart sides 29 (only one shown). The housing 22 may be constructed of any conventional material and forms an inside compartment for the storage of clothes, personal item, and the like of the type transported by a suitcase.

Figure 8:
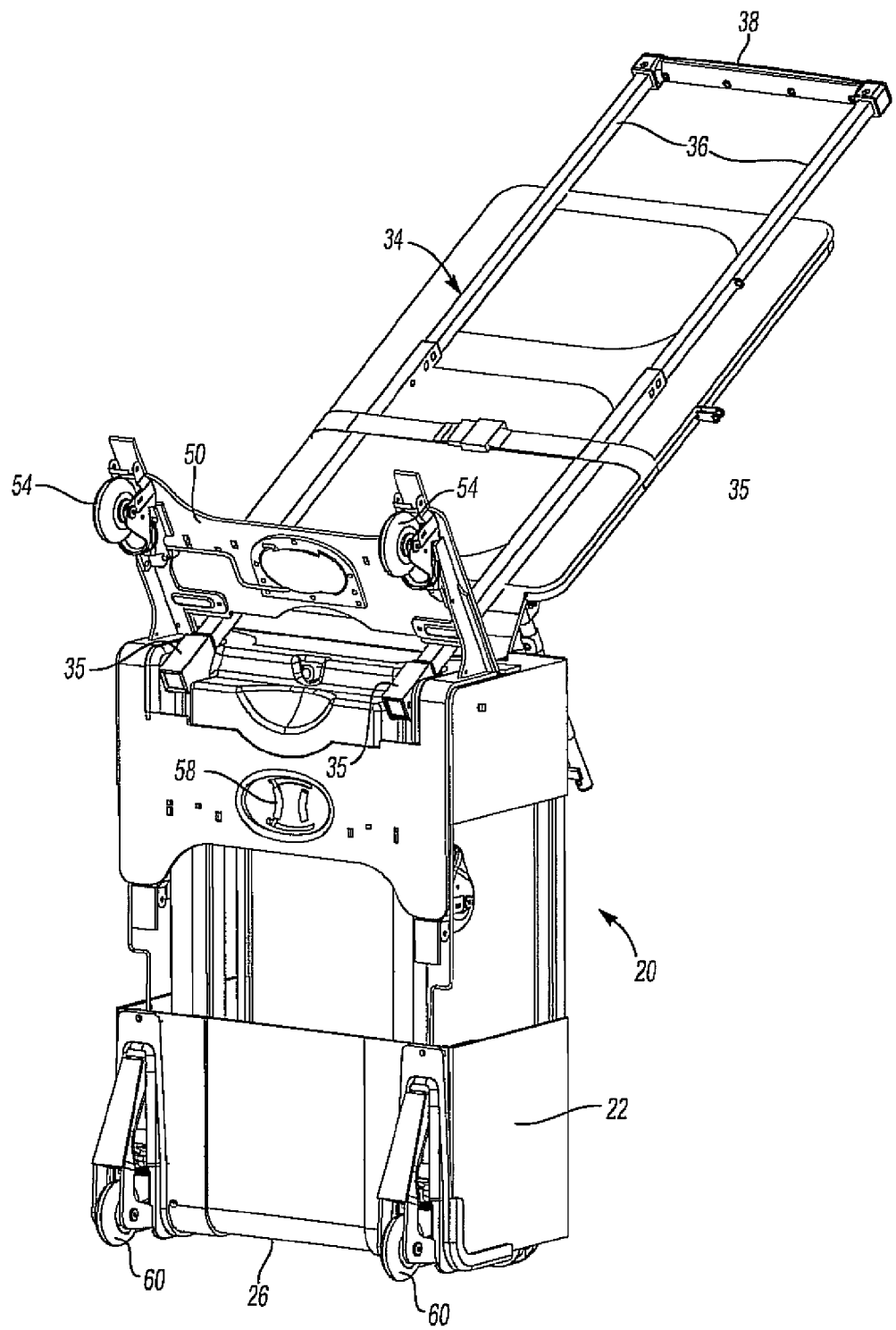
FIG. 8 is a bottom perspective view of the combination suitcase and baby carrier.

With reference now to FIGS. 3 and 8, an elongated handle 34 is slidably mounted to guides 35 (FIG. 8) pivotally attached to the housing 22 and movable between a storage position, illustrated in FIG. 1, in which at least most of the handle is contained within the housing 22, and an extended position in which the handle extends outwardly from one end of the housing as shown in FIG. 3. As illustrated, the handle 34 includes a pair of elongated, parallel, and spaced apart side rails 36 joined together at one end by a crossbar 38. Other types of handles, however, may be utilized without deviation from the spirit or scope of the invention.

With the handle 34 in its extended position, the handle 34 is pivotal between a first position, illustrated in FIG. 3, and a second position, illustrated in FIG. 4. In its first position, the handle 34 generally lies in a plane either coplanar or in a parallel plane to the bottom 28 of the housing 22. Conversely, in its second position, shown in FIG. 4, the handle 34 lies in a plane which is oblique relative to the plane of the housing bottom 28 and so that the crossbar 38 is positioned above the plane of the top 30 of the housing 22.

Preferably, a latch mechanism is provided to selectively lock the handle in the first position as well as the second position. Although any conventional latch mechanism may be utilized, as illustrated in FIG. 4, a locking pin 40 cooperates with both the housing 22 as well as the handle 34 to selectively lock the handle in either its first or second position.

With reference now to FIGS. 4-8, a rear wheel support bracket 50 is pivotally mounted to the housing 22 by a pivot pin 52 (FIGS. 6 and 7) adjacent the bottom 28 and rear end 24 of the housing 22. At least one, and preferably two spaced apart rear wheels 54 are mounted to the bracket 50.

The bracket 50 is pivotal between a collapsed position, illustrated in FIGS. 3 and 6, and an operational position, illustrated in FIGS. 4, 7 and 8. In its collapsed position (FIGS. 3 and 6), the rear wheels 54 are contained within the housing 22 and the bracket 50 is positioned against the bottom 28 of the housing 22. Conversely, in its operational position, the bracket 50 pivots so that the bracket 50 extends rearwardly and downwardly from the end 24 and bottom 28 of the housing, respectively. When the bracket 50 is in its operational position, the rear wheel or wheels 54 are positioned beneath the bottom 20 of the housing 22 for engagement with the ground support surface.

Any conventional latch mechanism 58 (FIG. 8) may be utilized to selectively lock the bracket 50 in both its collapsed position (FIG. 3) as well as its operational position (FIG. 4).

Referring now to FIGS. 6-8, at least one, and preferably two front wheels 60 are rotatably mounted to the housing 22 adjacent its front end 26. Typically, at least a portion of the wheels 60 protrudes outwardly from the housing so that, when the device of the present invention is used strictly as a suitcase, the front wheels 60 enable the user to roll the suitcase along the wheels 60 and with the handle 30.

Optionally, however, the front wheels 60 are pivotal between a collapsed position, illustrated in FIG. 6, and an extended position, illustrated in FIG. 7. In the collapsed position, only a portion of the wheels 60 protrudes outwardly from the housing 22. Conversely, in their operational position (FIG. 7), the wheels 60 extend entirely outwardly from the bottom 28 of the housing 22.

As best shown in FIGS. 6 and 7, although any means may be used to allow the front wheels 60 to be moved between the collapsed position and operational position, a front wheel support bracket 62 is pivotally mounted by a pivot pin 64 at one end while a guide pin 66 is secured to the other end of the bracket 62. This guide pin 66 is slidably mounted within a guide bracket 68 secured to the housing 22. A spring 68 normally urges the bracket 62, with its attached front wheel 60, to the collapsed position.

An actuator 70, preferably an elongated cable or rigid rod, has one end 71 connected to the rear wheel support bracket 50 and its other end 73 connected to an actuator pin 72. This actuator pin 72 is positioned between the housing and an inclined support surface 74 on the front wheel bracket 62.

The end 71 of the actuator 70 secured to the rear wheel support bracket 50 is secured to the bracket 50 at a position radially offset from the pivot pin 52. Consequently, as the rear wheel support bracket 50 is pivoted from its collapsed position (FIG. 6) and to its operational position (FIG. 7), the rear wheel support bracket 50 retracts the actuator 70 along with the actuator pin 72 toward the rear end 24 of the housing 22. In doing so, the actuator pin 72 acts as a cam and pivots the front wheel support bracket 62 from its collapsed position (FIG. 6) and to its operational position (FIG. 7).

With reference now particularly to FIGS. 2 and 5, when the front and rear wheels 54 and 60 are in their operational position and the handle is positioned in its second position as shown in FIG. 5, a top 80 of the housing 22 is removed, or at least opened, and positioned against the handle 30. The top 80 of the housing thus forms the back of a baby seat 82. The baby seat 82 preferably includes the appropriate straps 83 or safety belts in order to safely secure the infant or small child to the seat 82.

With the top 80 removed or opened to form the seat, a top panel 33 extends across and covers the top of the suitcase. This panel 33, covers and protects clothing or other articles in the suitcase.

From the foregoing, it can be seen that the present invention provides a combination suitcase and baby carrier which may be rapidly and easily converted from a straightforward suitcase to a combination suitcase and baby carrier. Having described my invention, however, many modifications thereto will become apparent to those skilled in the art to which it pertains without deviation from the spirit of the invention as defined by the scope of the appended claims.

I claim:

1. A combination suitcase and baby carrier comprising:
  a housing having a top, a bottom, a front, a rear, and two spaced apart ends,
  an elongated handle slidably mounted to said housing and movable between a storage position in which at least most of said handle is contained in said housing and an extended position in which said handle extends outwardly from one end of said housing,
  with said handle in said extended position said handle being pivotal between a first position in which said handle lies in a plane generally parallel to a plane of said housing bottom and a second position in which said handle lies in a plane oblique to said plane of said housing bottom,
  a rear wheel support bracket pivotally mounted to said housing adjacent said one end, at least one rear wheel attached to said rear wheel support bracket, said rear wheel support bracket being movable between a collapsed position in which said at least one rear wheel is contained in said housing and an operational position in which said at least one rear wheel protrudes outwardly from said housing bottom, at least one front wheel attached to an elongated front wheel bracket, said front wheel bracket having one end pivotally secured to said housing adjacent the other end of the housing, said at least one front wheel rotatably mounted to the other end of said front wheel bracket, said at least one front wheel protruding outwardly from said housing bottom, and a seat back selectively attachable to said handle, wherein said at least one front wheel and said front wheel bracket are pivotally mounted to said housing between a collapsed position in which at least a portion of said at least one front wheel is contained in said housing and an extended position in which said at least one front wheel extends outwardly from said housing bottom, an elongated actuator having one end secured to said rear wheel bracket and an actuator pin secured to the other end of said actuator, said actuator pin slidably abutting against an inclined surface on said front wheel bracket so that as said handle is pivoted to said second position, said actuator retracts said actuator pin toward said rear of said housing so that the actuator pin slides along said inclined surface of said front wheel bracket and pivots said front wheel bracket and said front wheel from said collapsed position to said extended position.

2. The combination suitcase and baby carrier as defined in claim 1 and comprising a latch mechanism which selectively locks said rear wheel support plate in said extended position.

3. The combination suitcase and baby carrier as defined in claim 1 wherein said handle comprises a pair of spaced apart and parallel rails joined together at one end by a crossbar.

4. The combination suitcase and baby carrier as defined in claim 1 wherein said rear wheel support bracket is pivotal about an axis parallel to a plane of said housing bottom.

5. The combination suitcase and baby carrier as defined in claim 1 wherein said housing is generally rectangular in shape.

6. The combination suitcase and baby carrier as defined in claim 1 wherein said housing includes a compartment for the storage of personal items.

7. The combination suitcase and baby carrier as defined in claim 1 wherein a portion of said housing top forms said seat back.

* * * * *